(12) United States Patent
Baldwin et al.

(10) Patent No.: US 8,288,650 B1
(45) Date of Patent: Oct. 16, 2012

(54) STACKABLE LIKE-GANGED ELECTRICAL BOXES

(75) Inventors: Jeffrey P. Baldwin, Phoenix, AZ (US); Richard L. Cleghorn, Tempe, AZ (US); Iven Dieterle, Tempe, AZ (US); Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 257 days.

(21) Appl. No.: 12/793,634

(22) Filed: Jun. 3, 2010

Related U.S. Application Data (60) Provisional application No. 61/183,916, filed on Jun. 3, 2009.

(51) Int. Cl.
*H05K 5/00* (2006.01)

(52) U.S. Cl. .................................................. 174/50
(58) Field of Classification Search ............ 174/50, 174/53, 58; 439/535; 248/906; 220/4.02
See application file for complete search history.

(56) References Cited

U.S. PATENT DOCUMENTS

7,273,392 B2 * 9/2007 Fields ........................ 439/535
* cited by examiner

*Primary Examiner* — Dhirubhai R Patel
(74) *Attorney, Agent, or Firm* — Booth Udall, PLC (57) ABSTRACT

A method and structure of a system of electrical boxes having at least two screw boss channels and at least two screw protrusions wherein the screw boss channels are complimentary shaped to the screw protrusions for selectively nesting like-ganged electrical boxes while preventing nesting of dislike-ganged electrical boxes for more space-efficient storage of electrical boxes while increasing inventory control and accuracy.

20 Claims, 6 Drawing Sheets

STACKABLE LIKE-GANGED ELECTRICAL BOXES

CROSS REFERENCE TO RELATED APPLICATIONS

This application claims the benefit of the filing date of U.S. Provisional Patent Application 61/183,916 to Baldwin et al. entitled "Stackable Like-Ganged Electrical Boxes" which was filed on Jun. 3, 2009, the disclosure of which is hereby incorporated herein by reference.

BACKGROUND OF THE INVENTION

1. Technical Field

Aspects and implementations of this document relate generally to electrical boxes. Particular implementations include electrical boxes designed to be nested with each other in a variety of ways (e.g., vertically stacked in a nested configuration) for storage, shipment, and the like while preventing nesting of certain electrical boxes that, for example, may have a different numbers of gangs.

2. Background Art

Electrical boxes are well known in the art of the electrical installation aspects of construction to house electrical components of such things as switches and receptacles. Conventional electrical boxes are typically one-piece structures with external features that make them somewhat voluminous. Therefore, it is desirable to improve the storability, portability and shippability of electrical boxes by providing electrical boxes designed to be nested and stacked allowing the boxes to be maintained in as minimal a space as possible.

There are multiple variations of electrical box designs known in the art including designs that accommodate any number of wires and wiring gauges, include external features to facilitate mounting or securing to external construction or other characteristics. Features of electrical boxes typically facilitate installation and improve functionality of the electrical box but these features may also make compact storage of groups of electrical boxes difficult.

SUMMARY

This disclosure includes one or more electrical box designs that do not impact the installation capabilities or features of an electrical box but allow nesting to reduce the amount of space required to store, carry or ship multiple boxes. A particular implementation employs complimentary shaped screw protrusions and screw boss channels for a first set of electrical boxes which are designed to nest within one another while utilizing an incompatible screw protrusion and screw boss channel for a second set of electrical boxes that are intended to nest within one another but not with the first set of electrical boxes.

A particular embodiment broadly comprises a system of electrical boxes comprising first and second similarly sized electrical boxes each comprising at least four sides extending from a bottom to an open top and at least two box mounting screw protrusions each having an aperture adjacent to each of at least two opposing sides, each box mounting screw aperture comprising an opening extending toward the open top of the first electrical box, at least two screw boss channels adjacent to each of the at least two opposing sides and complimentary shaped and sized to receive the at least two box mounting screw protrusions when the first electrical box is at least partially nested within the second electrical box, and a third electrical box comprising at least four sides extending from a bottom to an open top and at least two box mounting screw protrusions each having an aperture adjacent to each of at least two opposing sides, each box mounting screw aperture comprising an opening extending toward the open top of the third electrical box, at least two screw boss channels adjacent to each of the at least two opposing sides and shaped or sized to prevent receiving the at least two box mounting screw protrusions of the first and second electrical boxes.

Another particular embodiment broadly comprises a system of electrical boxes comprising a first electrical box having at least two box mounting screw protrusions and at least two screw boss channels complimentary shaped and sized to receive the first electrical box at least two box mounting screw protrusions, a second electrical box having at least two box mounting screw protrusions and at least two screw boss channels complimentary shaped and sized to receive the second electrical box at least two box mounting screw protrusions, a third electrical box having at least two box mounting screw protrusions and at least two screw boss channels complimentary shaped and sized to receive the third electrical box at least two box mounting screw protrusions, a fourth electrical box having at least two box mounting screw protrusions and at least two screw boss channels complimentary shaped and sized to receive the fourth electrical box at least two box mounting screw protrusions and, wherein the first electrical box mounting screw protrusions prevent nesting with the second, third, and fourth electrical boxes at least two screw boss channels, wherein the second electrical box mounting screw protrusions prevent nesting with the first, third, and fourth electrical boxes at least two screw boss channels, wherein the third electrical box mounting screw protrusions prevent nesting with the first, second, and fourth electrical boxes at least two screw boss channels and, wherein the fourth electrical box mounting screw protrusions prevent nesting with the first, second, and third electrical boxes at least two screw boss channels.

Still another particular embodiment broadly comprises a method of stacking like-ganged electrical boxes comprising providing a first plurality of first electrical boxes having a first number of gangs and each comprising complimentary shaped box mounting screw protrusions and screw boss channels, providing a first plurality of second electrical boxes having a second number of gangs and each comprising complimentary shaped box mounting screw protrusions and screw boss channels, stacking the first plurality of first electrical boxes together in a nested manner, stacking the second plurality of second electrical boxes together in a nested manner and, preventing nesting of the first plurality of first electrical boxes with the second plurality of second electrical boxes by aligning the first electrical box screw boss channels with the second electrical box mounting screw protrusions Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

BRIEF DESCRIPTION OF THE DRAWINGS

Features of particular embodiments and implementations of electrical boxes will hereinafter be described in conjunction with the appended drawings, where like designations denote like elements, and.

DETAILED DESCRIPTION

At the outset, it should be appreciated that like drawing numbers on different views identify identical, or functionally similar, structural elements. While the present inventions may be described with respect to what is presently considered to be the preferred embodiments, it is to be understood that the invention as claimed is not limited to the disclosed aspects.

This disclosure, its aspects and implementations, are not limited to the specific components or assembly procedures disclosed herein. Many additional components and assembly procedures known in the art consistent with the intended electrical boxes and/or assembly procedures for electrical boxes may be used and will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical boxes and implementing components, consistent with the intended operation and purpose of electrical boxes. As used herein, "electrical boxes" is intended to specifically refer to the types of electrical boxes that are mounted within a wall structure and to which small electrical devices such as electrical switches and electrical receptacles are mounted using box mounting device screws.

Figure 1:
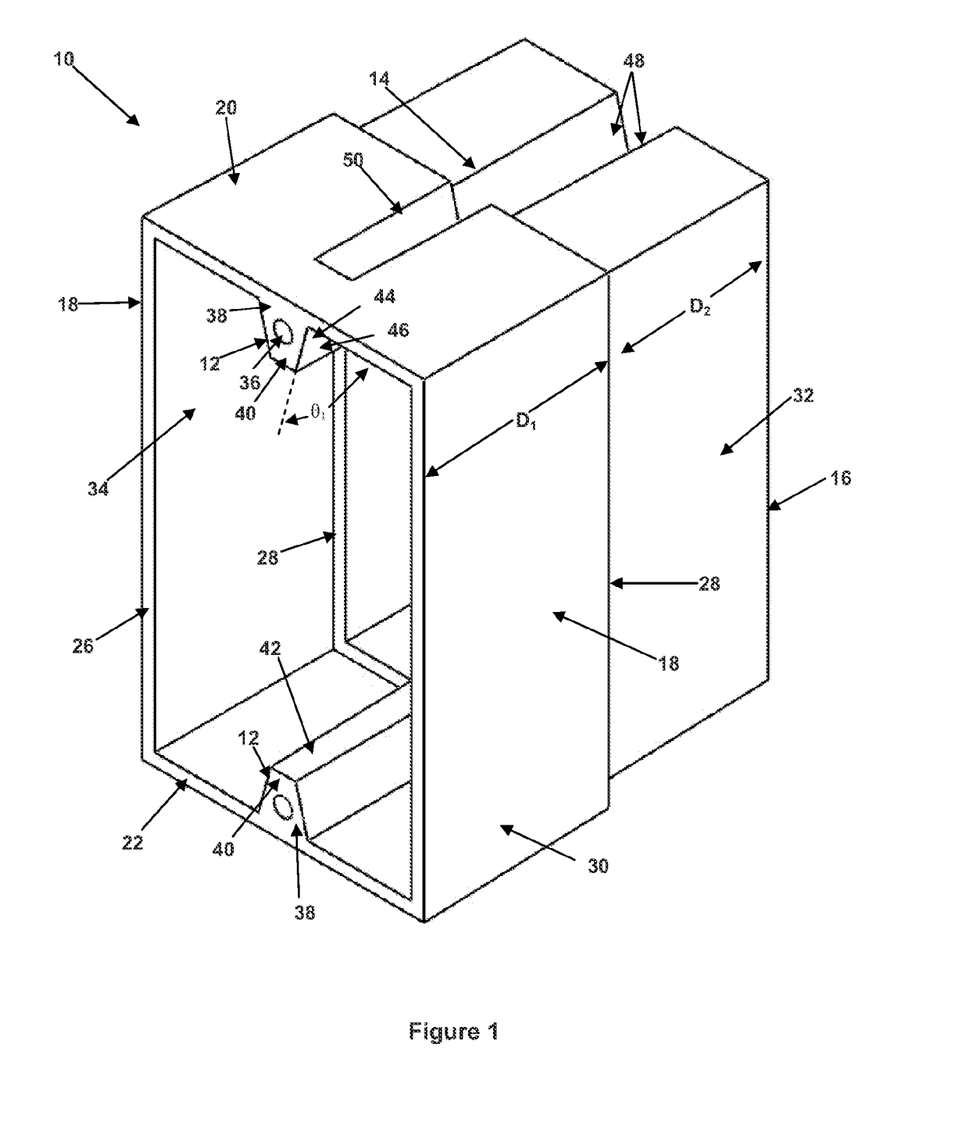
FIG. 1 is a perspective view of a preferred embodiment single-gang electrical box.

Accordingly, there are a variety of electrical box implementations. FIG. 1 illustrates a preferred embodiment single-gang electrical box 10 with a pair of box mounting screw protrusions 12 and a pair of screw boss channels 14 on the top and bottom. Specifically, electrical box 10 includes a back wall 16 with side walls 18, a top wall 20, and a bottom wall 22 extending forward therefrom. Side walls 18, top wall 20, and bottom wall 22 define a cavity 24 extending to a front surface 26 of the electrical box.

At approximately a mid-point, a shoulder 28 is formed in side walls 18, top wall 20, and bottom wall 22. Shoulder 28 functions to limit how far the electrical boxes nest within one another. In particular, electrical box 10 includes a front portion 30 which is larger than a rear portion 32. Front portion 30 has a depth D1, while rear portion 32 has a depth of D2. This arrangement allows the front portion 30 and cavity 24 to receive rear portion 32 during the nesting operation. The nesting depth can also be varied by modifying the position of shoulder 28 so that depths D1 and D2 are changed.

In accordance with one of the main features of this embodiment, screw protrusions 12 extend inward from an inner surface 34 at least partially defining cavity 24. Protrusions 12 may include through hole 36 that extends from front surface 26 and into screw boss channels 14. Through hole 36 is used to mount an electrical device, such as a light switch, a Ground Fault Circuit Interrupter (GFCI), a duplex outlet, or any other suitable electrical device.

Screw protrusions 12 also include a proximate portion 38 and a distal portion 40. Proximate portion 38 is preferably located adjacent inner surface 34 and either top wall 20 or bottom wall 22, respectively. Distal portion 40 may extend further inward from proximate portion 38 and terminates at an end 42 which defines the innermost position of each screw protrusion. The screw protrusions also have a sidewall 44 defining a portion of an outer surface 46 of the screw protrusion. Sidewall 44 of screw protrusion 12 is disposed at an angle $\theta_1$ with respect to top wall 20. Finally, screw protrusions 12 may extend from front surface 26 until shoulder 28 and beyond if necessary.

Screw boss channels 14 are complimentary shaped to receive screw protrusions 12 of a single-gang electrical box 10 and provide the requisite nesting function. Channels 14 are formed on top wall 20 and bottom wall 22 in this embodiment to match the location of screw protrusions 12. However, it is within the spirit and scope of this disclosure to locate both screw boss channels 14 and screw protrusions 12 on any wall of the electrical box.

Screw boss channels 14 include angled walls 48 that are shaped and sized similar to the outer periphery of screw protrusions 12 and strategically located to accept the same. Channels 14 may extend for the full length of D2, or rear portion 32, terminating near shoulder 28 and back wall 16. A secondary channel 50 may be the same size or reduced in size to provide an aesthetically pleasing box.

In the embodiment illustrated in FIG. 1, screw boss channels 14 of the single-gang electrical box 10 are shaped and sized complimentary to screw protrusions 12 of the single-gang electrical box so that each single-gang electrical box can be nested within each other. Specifically, angle $\theta_1$ of the screw protrusions matches the angle of angled walls 48 while also matching the cross-sectional dimensions of each other. Advantageously, this complimentary shaped protrusion and channel provides space saving functions while ensuring that only single-gang electrical boxes are stacked together, thereby also increasing inventory accuracy.

Figure 2:
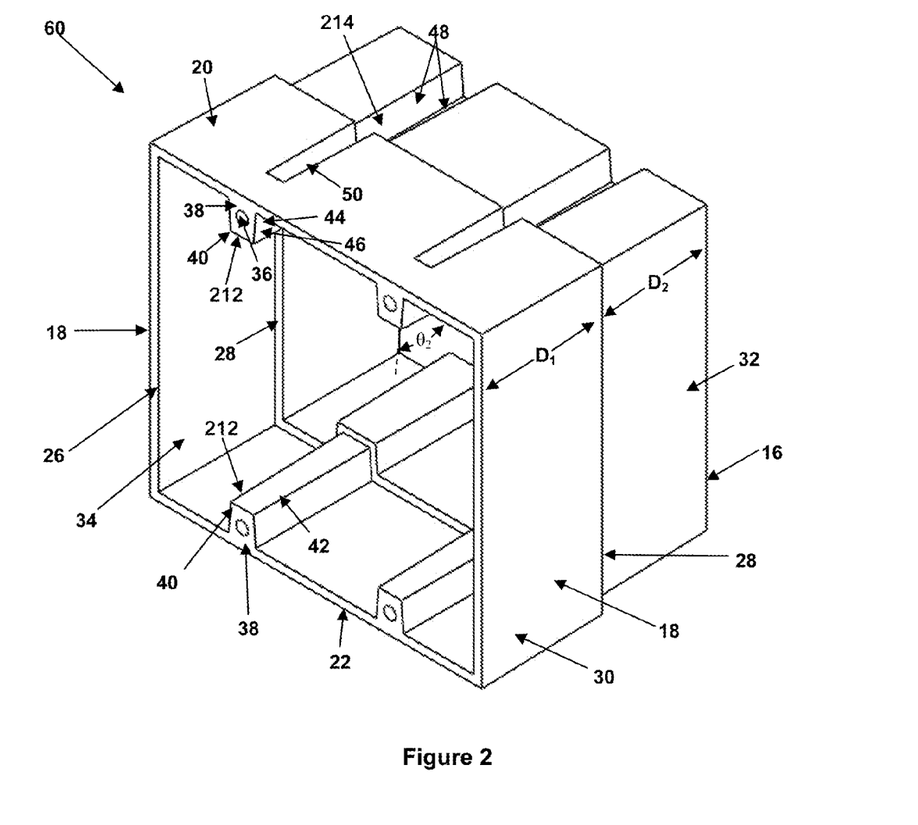
FIG. 2 is a perspective view of a preferred embodiment dual-gang electrical box.

Referring now to FIG. 2, a double-gang electrical box 60 is shown with four screw protrusions 212 extending inward from top wall 20 and bottom wall 22. Specifically, two screw protrusions 212 extend downward from an inner surface 34 of top wall 20, while two additional screw protrusions 212 extend upward from an inner surface 34 of bottom wall 22.

Additionally, a pair of screw boss channels 214 are formed in top wall 20 and a second pair of screw boss channels 214 are formed in bottom wall 22.

Similar to single-gang electrical box 10, screw protrusions 212 and screw boss channels 214 of the double-gang electrical box 60 are shaped and sized complimentary to one another to allow double-gang electrical box screw protrusions to slidingly engage double-gang electrical box screw boss channels. In particular, double-gang screw protrusions 212 also include sidewall 44 with outer surface 46. Nevertheless, an angle $\theta_2$ defined as the angle between sidewall 44 and top wall 20 or bottom wall 22 of the double-gang electrical box is less than $\theta_1$ and therefore the cross-sectional shape and size of double-gang screw protrusions 212 are different than a single-gang screw protrusion 12. Still further, the double-gang screw boss channel 214 is adapted to match and receive screw protrusions having an angle $\theta_2$. Accordingly, only a double-gang screw protrusion 212 can fit within a double-gang screw boss channel 214 and cannot be nested within a single-gang 10, a triple-gang 70, or a 4-gang electrical box 80 (as discussed below).

Figure 3:
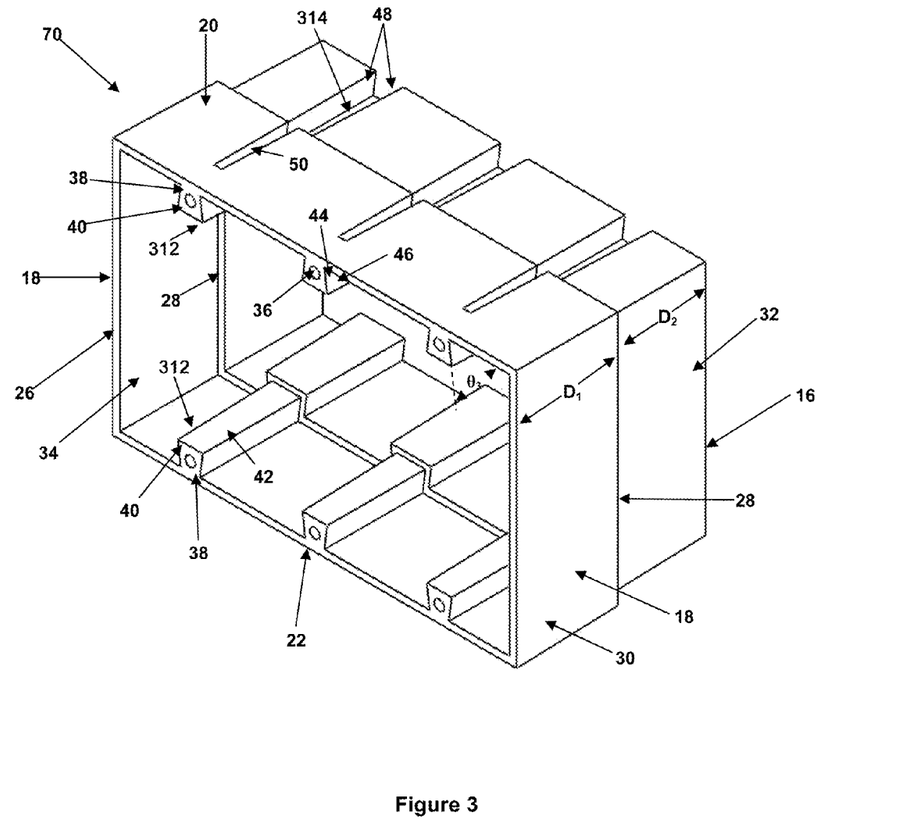
FIG. 3 is perspective view of a preferred embodiment triple-gang electrical box.

Referring to FIG. 3, a triple-gang electrical box 70 is shown with six screw protrusions 312 extending inward from top wall 20 and bottom wall 22. Specifically, three screw protrusions 312 extend downward from an inner surface 34 of top wall 20, while three additional screw protrusions 312 extend upward from an inner surface 34 of bottom wall 22. Additionally, three screw boss channels 314 are formed in top wall 20 and three additional screw boss channels 314 are formed in bottom wall 22.

Similar to single-gang electrical box 10 and double-gang electrical box 60, screw protrusions 312 and screw boss channels 314 of triple-gang electrical box 70 are shaped and sized complimentary to one another to allow triple-gang electrical box screw protrusions 312 to slidingly engage triple-gang electrical box screw boss channels 314. In particular, triple-gang screw protrusions 312 also include sidewall 44 with outer surface 46. Nevertheless, an angle $\theta_3$ defined as the angle between sidewall 44 and top wall 20 or bottom wall 22 of the triple-gang electrical box 70 is less than $\theta_1$ and $\theta_2$ and therefore the cross-sectional shape and size of triple-gang screw protrusions 312 are different from both the single-gang screw protrusion and the double-gang screw protrusion. Still further, the triple-gang screw boss channel 314 is adapted to match and receive screw protrusions having an angle $\theta_3$. Accordingly, only a triple-gang screw protrusion 312 can fit within a triple-gang screw boss channel 314 and cannot be nested within a single-gang 10, a double-gang 60, or a 4-gang electrical box 80.

Figure 4:
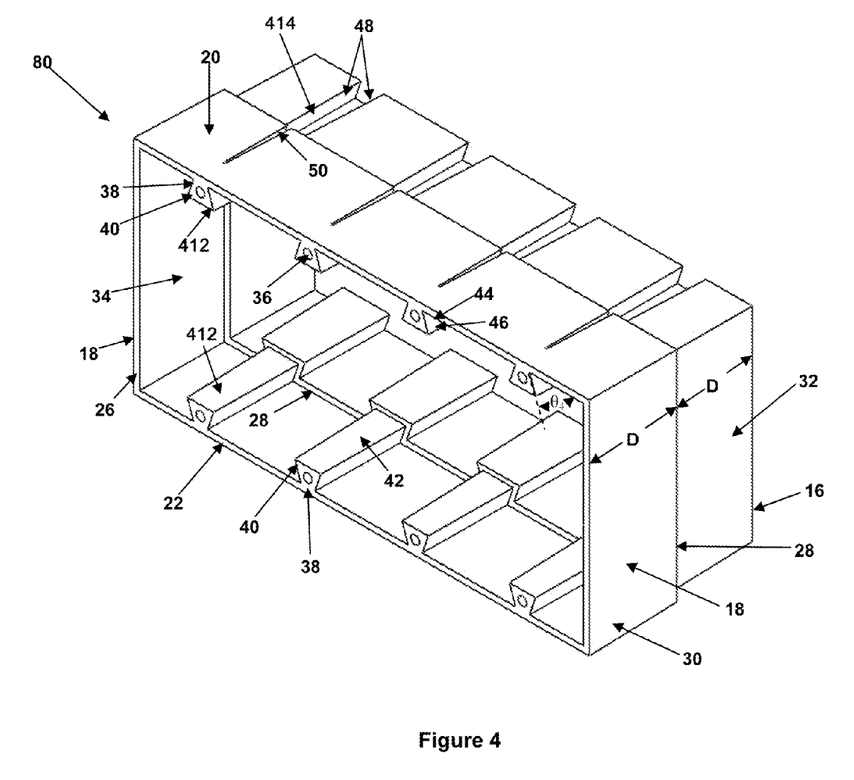
FIG. 4 is a perspective view of a preferred embodiment 4-gang electrical box.

Referring now to FIG. 4, a 4-gang electrical box 80 is shown with eight screw protrusions 412 extending inward from top wall 20 and bottom wall 22. Specifically, four screw protrusions 412 extend downward from an inner surface 34 of top wall 20, while four additional screw protrusions 412 extend upward from an inner surface 34 of bottom wall 22. Additionally, four screw boss channels 414 are formed in top wall 20 and four additional screw boss channels 414 are formed in bottom wall 22.

Similar to single-gang electrical box 10, double-gang electrical box 60, and triple-gang electrical box 70, screw protrusions 412 and screw boss channels 414 of 4-gang electrical box 80 are shaped and sized complimentary to one another to allow 4-gang electrical box screw protrusions 412 to slidingly engage 4-gang electrical box screw boss channels 414. In particular, 4-gang screw protrusions 412 also include sidewall 44 with outer surface 46. Nevertheless, an angle $\theta_4$ defined as the angle between sidewall 44 and top wall 20 or bottom wall 22 of the 4-gang electrical box is less than $\theta_1$, $\theta_2$, and $\theta_3$ and therefore the cross-sectional shape and size of 4-gang screw protrusions 412 are different from the single-gang screw protrusion, the double-gang screw protrusion, and the triple-gang screw protrusion. Still further, the 4-gang screw boss channel 414 is adapted to match and receive screw protrusions having an angle $\theta_4$. Accordingly, only a 4-gang screw protrusion 412 can fit within a 4-gang screw boss channel 414 and cannot be nested within a single-gang, a double-gang, or a triple-gang.

Figure 5:
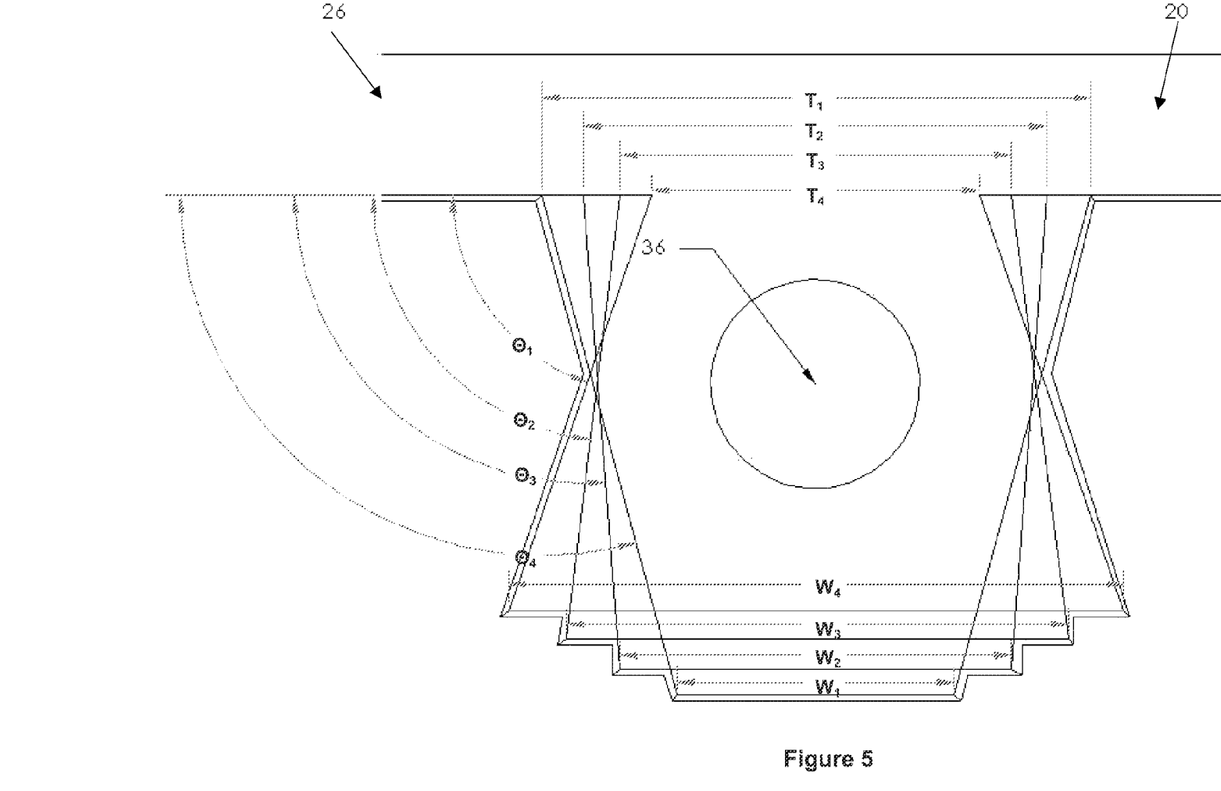
FIG. 5 is a top view single-gang, dual-gang, triple-gang, and 4-gang box mounting screw protrusions and screw channel bosses superimposed upon one another; and, FIG. 6 is a perspective view of a single-gang electrical box unable to nest within a triple-gang electric box due to incompatibility of the box mounting screw protrusions and the screw channel bosses.

FIG. 5 illustrates a view of screw protrusions 12, 212, 312, 412 of a single-gang electrical box 10, a double-gang electrical box 60, a triple-gang electrical box 70, and a 4-gang electrical box 80, respectively, superimposed on one another. Further, each respective angle $\theta_1$, $\theta_2$, $\theta_3$, and $\theta_4$ are shown in addition to a central intersection point for each of the screw protrusions. For example, screw protrusions of the single-gang electrical box is at least partially defined by $T_1$ and $W_1$, where $T_1$ represents the largest width of proximate portion 38 and $W_1$ represents the smallest width of distal portion 40. Similarly, double-gang electrical box screw protrusions are at least partially defined by $T_2$ and $W_2$, while triple-gang electrical box screw protrusions are at least partially defined by $T_3$ and $W_3$, and 4-gang electrical box screw protrusions are at least partially defined by $T_4$ and $W_4$. Thus, it is seen that regardless of which dislike gang electrical boxes (meaning electrical boxes have a different number of gangs) a user attempts to connect, there will be sufficient interference to prevent mating of the dislike screw protrusions and screw boss channels.

A particular embodiment of a single-gang screw protrusion and screw boss channel (not shown in FIG. 5) has proximate width 38 of $T_1$ that is larger than distal width 40 of $W_1$. Similarly, a particular embodiment of a double-gang screw protrusion and screw boss channel (not shown) has proximate width 38 of $T_2$ that is slightly larger than distal width 40 of $W_2$. Further, a particular embodiment of a triple-gang screw protrusion and screw boss channel (not shown) has proximate width 38 of $T_3$ that is slightly smaller than distal width 40 of $W_3$. Finally, a particular embodiment of a 4-gang screw protrusion and screw boss channel (not shown) has proximate width 38 of $T_4$ that is smaller than distal width 40 of $W_4$. While the description and Figures illustrate particular embodiments and implementations, and specific sizes, shapes, and configurations of the screw protrusions and screw boss channels, it is within the spirit and scope of the present disclosure to incorporate any suitable size, shape, and configuration so long as electrical boxes that are designed to mate together have complimentary screw protrusions and screw boss channels while each varying subset of electrical boxes has a different size, shape, or configuration. The term subset is used to define a group of electrical boxes that are nestable within one another and does not necessarily require that they have the same number of gangs.

Figure 6:
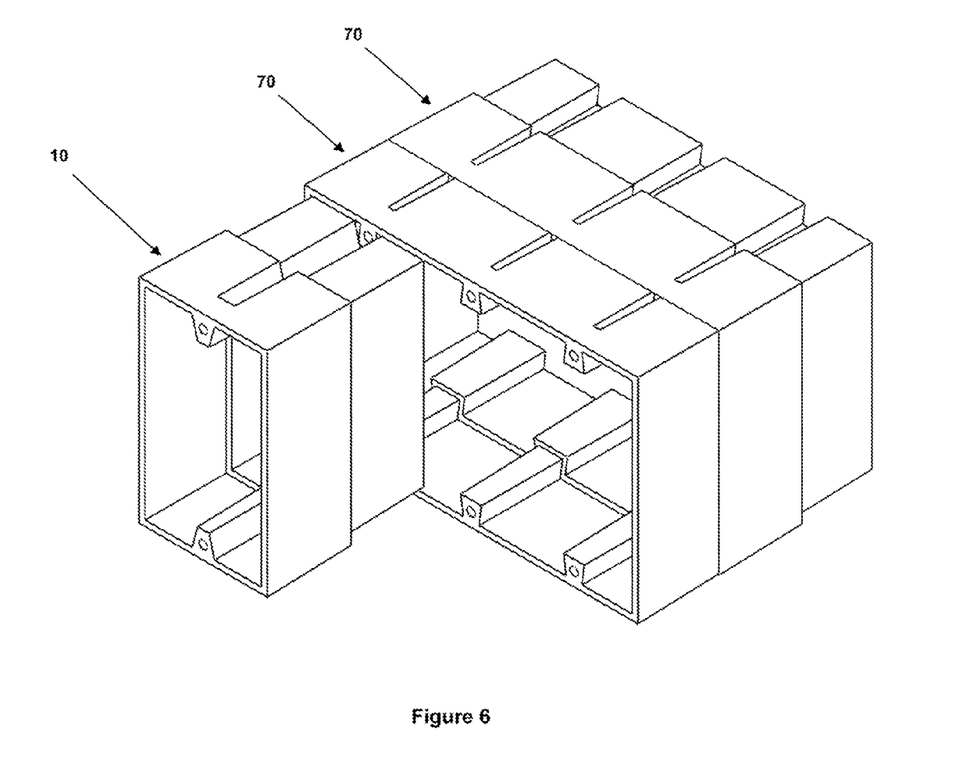

Referring now to FIG. 6, a user is attempting to nest single-gang electrical box 10 within triple-gang electrical box 70. In particular, a user is locating screw boss channel 14 and back wall 22 of single-gang electrical box 10 near front surface 26 and screw protrusions 312 of triple-gang electrical box 70. For example, screw protrusions 312 on top wall 20 and bottom wall 22 of the triple-gang electrical box 70 are each aligned with screw boss channels 14 on top wall 20 and bottom wall 22 of the single-gang electrical box but the single-gang unit is not nestable within the triple-gang unit because the screw protrusions and screw boss channels are incompatible with one another. Thus it is seen that nesting can be achieved to selectively increase shipping density while ensuring that only like-ganged electrical boxes are nested within one another. While particular embodiments have been illustrated and described as nesting only like-ganged electrical boxes, it is within the spirit and scope of the present invention to selectively permit nesting of any electrical box while preventing nesting of undesired electrical boxes by utilizing incompatible screw protrusions and channel bosses.

Other shapes and configurations of electrical boxes are contemplated as well. For example, round electrical boxes (such as ceiling boxes), octagon boxes, square boxes, and any other rectilinear or curvilinear shaped boxes and the like may also be used.

In places where the description above refers to particular implementations of an electrical box, it should be readily apparent that a number of modifications may be made without departing from the spirit thereof. The disclosed implementations are, therefore, to be considered in all respects as illustrative and not restrictive. Accordingly, many additional implementations are possible. The accompanying claims are intended to cover such modifications as would fall within the true spirit and scope of the disclosure set forth in this document. All changes that come within the meaning of and range of equivalency of the claims are intended to be embraced therein.

Additionally, while the configuration and nesting of electrical box implementations have been described, it will be understood that the configuration and nesting of electrical box implementations are not limited to the specific components or steps as disclosed. Any components or steps or sequence of steps indicated herein are given as examples of possible components, steps or sequence of steps and not as limitations, since various configurations, processes and sequences of steps may be used. Other electrical box implementations may be configured and nested in similar manners.

The concepts disclosed herein are not limited to the specific implementations shown herein. For example, implementations of electrical boxes, and implementing components, may be formed of any of many different types of materials or combinations thereof that can readily be formed into shaped objects provided that the materials selected are consistent with the intended operation of electrical box implementations. For example, the components may be formed of: polymers such as thermoplastics (such as ABS, Fluoropolymers, Polyacetal, Polyamide; Polycarbonate, Polyethylene, Polypropylene (low or high density), Polysulfone, and/or the like), thermosets (such as Epoxy, Phenolic Resin, Polyimide, Polyurethane, Silicone, and/or the like), any combination thereof, and/or other like materials; composites and/or other like materials; metals and/or other like materials; alloys and/or other like materials; any other suitable material; and/or any combination of the foregoing thereof. Also, appropriate mounting fasteners, hardware and components may be provided. Those of ordinary skill in the art will readily be able to select appropriate materials and manufacture these products from the disclosures provided herein.

Furthermore, the electrical boxes, screw protrusions, screw channel bosses, and any other components forming any particular implementation of an electrical box may be manufactured simultaneously or separately and integrally joined with one another, while other components may be pre-manufactured or manufactured separately and then assembled with the integral components. Various implementations may be manufactured using conventional procedures as added to and improved upon through the principles described here. Accordingly, manufacture of these components separately or simultaneously may involve extrusion, vacuum forming, injection molding, blow molding, casting, forging, cold rolling, milling, drilling, reaming, turning, grinding, stamping, pressing, cutting, bending, welding, soldering, hardening, riveting, punching, and/or the like. Components manufactured separately may then be coupled or removably coupled with the other integral components, if necessary, in any manner, such as with adhesive, a weld joint, a solder joint, a fastener (e.g. a bolt, a bolt and a nut, a screw, a rivet, a pin, and/or the like), washers, retainers, any combination thereof, and/or the like for example, depending on, among other considerations, the particular material forming the components. Other possible steps might include sand blasting, polishing, powder coating, zinc plating, anodizing, hard anodizing, and/or painting the components for example.

For example, via injection molding, versions of electrical boxes can be made by the use of a dedicated tool (e.g., a mold) for each version or by making one tool with a specific set of first version cavities, a specific set of second version cavities, a specific set of third version cavities, and the like.

One particular benefit that may be found in particular implementations of electrical boxes disclosed in this document is the value added from being able to store and transport identical electrical boxes in a nested condition. By significantly reducing the transport size, the transport and storage cost is also significantly reduced. Further, inventory can be more closely controlled by ensuring that only similarly situated electrical boxes are stored and or shipped together.

The invention claimed is:

1. A system of electrical boxes comprising:
   first and second similarly sized electrical boxes each comprising:
      at least four sides extending from a back wall to an open front and at least two box mounting screw protrusions proximate the open front and adjacent to each of at least two opposing sides of the at least four sides, each box mounting screw protrusion comprising a hole extending toward the open front of the respective electrical box;
   at least two screw boss channels proximate the back wall on each of the at least two opposing sides, the at least two screw boss channels complimentary shaped and sized to receive the at least two box mounting screw protrusions when one of the first and second electrical boxes is at least partially nested within the other electrical box; and,
   a third electrical box comprising:
      at least four sides extending from a back wall to an open front and at least two box mounting screw protrusions proximate the open front and adjacent to each of at least two opposing sides of the at least four sides, each box mounting screw protrusions of the third electrical box comprising a hole extending toward the open front of the third electrical box;
      at least two screw boss channels proximate the back wall on each of the at least two opposing sides, the at least two screw boss channels of the third electrical box shaped to prevent receiving the at least two box mounting screw protrusions of the first and second electrical boxes.

2. The system of electrical boxes of claim 1 wherein the at least two box mounting screw protrusions of each of the first and second electrical boxes each further comprise a proximate portion larger than a distal portion.

3. The system of electrical boxes of claim 2 wherein the at least two box mounting screw protrusions of the third electrical box each further comprise a proximate portion smaller than a distal portion.

4. The system of electrical boxes of claim 1 wherein the at least two screw boss channels of the first and second electrical boxes each further comprise a proximate portion larger than a distal portion.

5. The system of electrical boxes of claim 4 wherein the at least two box screw boss channels of the third electrical box each further comprise a proximate portion smaller than a distal portion.

6. The system of electrical boxes of claim 1 wherein the first and second electrical boxes comprise a first number of gangs, the third electrical box comprises a second number of gangs, and the first number of gangs and the second number of gangs are different.

7. The system of electrical boxes of claim 6 wherein the first number of gangs is one gang and the second number of gangs is selected from the group consisting of two gangs, three gangs, and four gangs.

8. The system of electrical boxes of claim 6 wherein the first number of gangs is two gangs and the second number of gangs is selected from the group consisting of one gang, three gangs, and four gangs.

9. The system of electrical boxes of claim 6 wherein the first number of gangs is three gangs and the second number of gangs is selected from the group consisting of one gang, two gangs, and four gangs.

10. The system of electrical boxes of claim 6 wherein the first number of gangs is four gangs and the second number of gangs is selected from the group consisting of one gang, two gangs, and three gangs.

11. The system of electrical boxes of claim 1 wherein the at least two box mounting screw protrusions of each of the first and second electrical boxes each further comprise a sidewall having a first angle with respect to one of the sides, the at least two box mounting screw protrusions of the third electrical box each further comprise a sidewall having a second angle with respect to one of the sides, and the first angle is different than the second angle.

12. The system of electrical boxes of claim 11 wherein the first angle is larger than the second angle.

13. The system of electrical boxes of claim 11 wherein the first angle is smaller than the second angle.

14. The system of electrical boxes of claim 11 further comprising a fourth electrical box having at least two box mounting screw protrusions on opposing sides each further comprising a sidewall having a third angle with respect to one of the sides, and a fifth electrical box having at least two box mounting screw protrusions on opposing sides each further comprising a sidewall having a fourth angle with respect to one of the sides and wherein the first angle, the second angle, the third angle, and the fourth angle are each different from one another.

15. The system of electrical boxes of claim 1 wherein the at least two box mounting screw protrusions of each of the first and second electrical boxes further comprise a cross-sectional size that is larger than a cross-sectional size of the at least two screw boss channels of the third electrical box.

16. A system of electrical boxes comprising:
a first electrical box comprising at least two box mounting screw protrusions extending toward an open front of the first electrical box and adjacent to opposing sides of the first electrical box, and at least two screw boss channels on the opposing sides of the first electrical box complimentary shaped and sized to receive at least two box mounting screw protrusions of another similarly sized and shaped first electrical box;
a second electrical box comprising at least two box mounting screw protrusions extending toward an open front of the second electrical box and adjacent to opposing sides of the second electrical box and at least two screw boss channels on the opposing sides of the second electrical box complimentary shaped and sized to receive at least two box mounting screw protrusions of another similarly sized and shaped second electrical box; and
a third electrical box comprising at least two box mounting screw protrusions extending toward an open front of the third electrical box and adjacent to opposing sides of the third electrical box and at least two screw boss channels on the opposing sides of the third electrical box complimentary shaped and sized to receive at least two box mounting screw protrusions of another similarly sized and shaped third electrical box;
wherein shaping and sizing of the first electrical box mounting screw protrusions prevent nesting with the at least two screw boss channels of each of the second and third electrical boxes;
wherein shaping and sizing of the second electrical box mounting screw protrusions prevent nesting with the at least two screw boss channels of each of the first and third electrical boxes; and
wherein shaping and sizing of the third electrical box mounting screw protrusions prevent nesting with the at least two screw boss channels of each of the first and second electrical boxes.

17. The system of electrical boxes of claim 16 wherein the first electrical box is nestable with another first electrical box, the second electrical box is nestable with another second electrical box, and the third electrical box is nestable with another third electrical box.

18. The system of electrical boxes of claim 16 wherein each of the electrical boxes further comprises a shoulder and wherein the shoulder limits nesting.

19. A method of stacking like-ganged electrical boxes comprising:
providing a first plurality of first electrical boxes each comprising a first number of gangs and complimentary shaped box mounting screw protrusions and screw boss channels on opposing sides of each first electrical box;
providing a second plurality of second electrical boxes each comprising a second number of gangs and complimentary shaped box mounting screw protrusions and screw boss channels on opposing sides of each second electrical box, wherein the complimentary shaped box mounting screw protrusions and screw boss channels of the second electrical boxes are shaped differently than the complimentary shaped box mounting screw protrusions and screw boss channels of the first electrical boxes;
stacking the first plurality of first electrical boxes together in a nested manner;
stacking the second plurality of second electrical boxes together in a nested manner; and,
preventing nesting of the first plurality of first electrical boxes with the second plurality of second electrical boxes by aligning the first electrical box screw boss channels with the second electrical box mounting screw protrusions.

20. The method of claim 19 further comprising the step of limiting the nesting of the first plurality of first electrical boxes by contacting a shoulder of an adjacent first electrical box.

* * * * *